United States Patent [19]

Khoe

[11] Patent Number: 4,690,493
[45] Date of Patent: Sep. 1, 1987

[54] METHOD AND DEVICE FOR POSITIONING LIGHT-CONDUCTING FIBRES

[75] Inventor: Giok D. Khoe, Eindhoven, Netherlands

[73] Assignee: U.S. Philips Corp., New York, N.Y.

[21] Appl. No.: 489,283

[22] Filed: Apr. 28, 1983

[30] Foreign Application Priority Data

May 12, 1982 [NL] Netherlands .................. 8201941

[51] Int. Cl.$^4$ .............................................. G02B 6/36
[52] U.S. Cl. ............................. 350/96.20; 350/96.10
[58] Field of Search ....................... 350/96.20, 96.21; 356/73.1

[56] References Cited

U.S. PATENT DOCUMENTS

| | | | |
|---|---|---|---|
| 4,049,414 | 9/1977 | Smith | 64/4 |
| 4,289,374 | 9/1981 | Franken et al. | 350/96.20 |
| 4,307,296 | 12/1981 | Presby | 250/459 |
| 4,362,943 | 12/1982 | Presby | 356/73.1 X |
| 4,451,115 | 5/1984 | Nicia et al. | 350/96.18 |
| 4,506,947 | 3/1985 | Tatekuro et al. | 350/96 |

OTHER PUBLICATIONS

Hatakeyama, I. et al., "Fusion Splices for Single-Mode Optical Fibers", IEEJ. Quantum Elec., vol. QE-14, No. 8, pp. 614-619, (Aug. 1978).

Franken, A. J. J., et al., "Experimental Semi-Automatic Machine for Hot Splicing Glass Fibres for Optical Communcation". Philips Tech. Rev., vol. 38, No. 6, pp. 158-159, (1978/79).

Kinoshita, K. et al., "End Preparation and Fusion Splicing of an Optical Fiber Array with a $CO_2$ Laser". Applied Optics, vol. 18, No. 19, pp. 3256-3260, (Oct. 1979).

Miller, C. M., "Local Detection Device for Single-Mode Fiber Splicing".

Paper THAAZ, Digest Topical Meeting on Optical Fibre Communication, Phoenix, Arizona, pp. 44-45, (Apr. 13-15, 1982).

Primary Examiner—William L. Sikes
Assistant Examiner—Akm E. Ullah
Attorney, Agent, or Firm—Marc D. Schechter

[57] ABSTRACT

A portion of a fiber to be positioned is transversely irradiated by means of an ultraviolet light source. The source emits ultraviolet light of such a wavelength that fluorescence is produced in the core of the fiber. The visible light produced in the core by the fluorescence is used to make observations for visually controlling the position of the fiber. In this manner, cores of light conducting fibers can be positioned very accurately even when they are arranged eccentrically in the cladding.

4 Claims, 3 Drawing Figures

METHOD AND DEVICE FOR POSITIONING LIGHT-CONDUCTING FIBRES

BACKGROUND OF THE INVENTION

The invention relates to a method of visually positioning light conducting fibers. The invention also relates to a device for visually positioning light conducting fibers.

The method and device can be used to position the ends of two light conducting fibers with respect to each other and with respect to a heat source so that the fibers can be welded to each other. An example of such a method and device is described in an article by I. Hatakeyama, et al entitled "Fusion Splices for Single-Mode Optical Fibers" (I.E.E.E. Journal of Quantum Electronics, Vol. QE-14, No. 8, pages 614–619, August 1978). Since the light conduction in light conducting fibers takes place through the core, the orientation of the core is of importance during positioning. In the known welding apparatus, however, it is common practice to illuminate the claddings of the fibers and to observe the claddings by means of, for example, a microscope or a projection system. When the core is arranged eccentrically to the outer circumference of the cladding, positioning errors result. These errors may lead to unacceptably large light losses in the weld, especially when monomode fibers are welded.

This disadvantage can be overcome by illuminating one fiber and measuring the quantity of light emanating from the second fiber. When this quantity of light is at a maximum, the cores of the fibers at the area of the weld are positioned correctly.

Another method, in which the light conducted through the core and emanating at an end of the fiber is observed, can be used when an end of a light conducting fiber has to be mounted in an envelope. The surface of the envelope will serve later on as a reference surface for automatically bringing the core of the fiber to the desired position in, for example, an optical connector. An example thereof is described in U.S. Pat. No. 4,289,374.

A similar method can also be used when a fiber end must be arranged in the correct position with respect to a lens, as described in U.S. Pat. No. 4,451,115 (corresponding to Dutch Patent Application No. 7905610). However, all these methods are impractical because in order to introduce the light into the core, the other end of the fiber must be illuminated. This end may be kilometers away from the splice.

SUMMARY OF THE INVENTION

It is an object of the invention to provide a method of visually positioning light conducting fibers in a simple and easy manner. In the method according to the invention, a portion of the fiber to be positioned is irradiated transversely with ultraviolet light having a wavelength such that fluorescence is produced in the core of the fiber. The visual light produced by the fluorescence in the core is used to visually control the position of the core.

It should be noted that it is known per se from U.S. Pat. No. 4,307,296 to visualize the core of a light-conducting fiber by irradiation with ultraviolet light for measuring the diameter thereof.

A modification of the method according to the invention is particularly suitable for observing the light emanating from the core at an end of the fiber, without illuminating the other end of the fiber. In this modification, the light conducting fiber is irradiated at a certain distance from a first end of the fiber. For this purpose, the opaque coating is removed from the fiber at the area to be irradiated. The visible light emanating from the first end of the fiber is observed directly or through a further light-conducting fiber for visually controlling the position of the core.

The device according to the invention comprises an ultraviolet light source for transversely irradiating a portion of a fiber to be positioned. The light source is designed to emit ultraviolet light of a wavelength which produces fluorescence in the core of the fiber.

DESCRIPTION OF THE PREFERRED EMBODIMENTS

Figure 1:
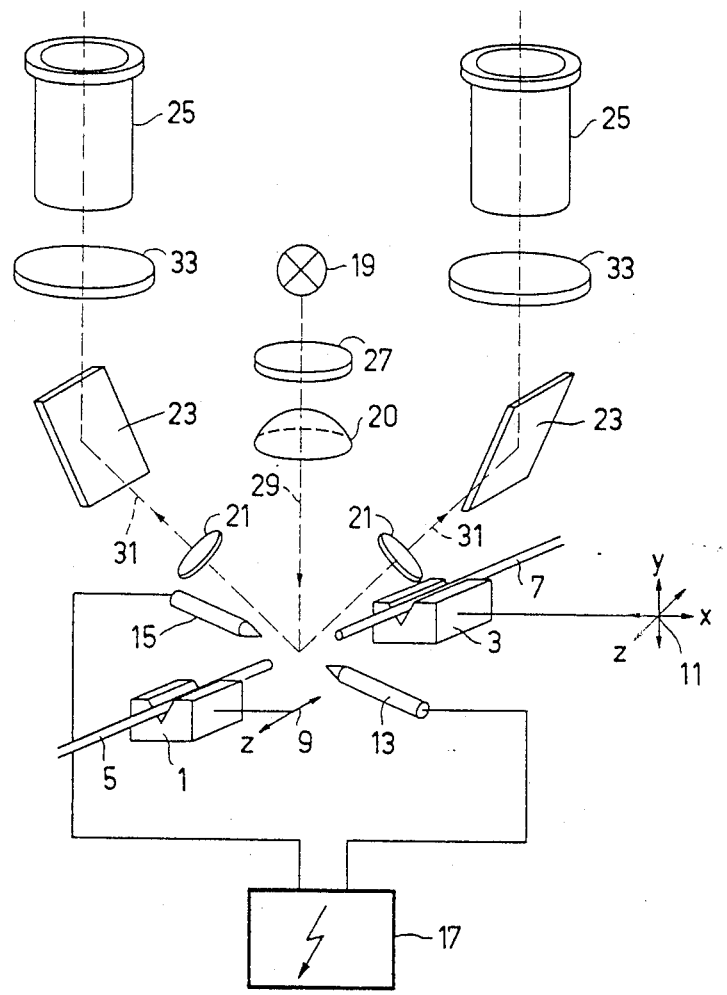
FIG. 1 is a schematic representation of a part of a welding apparatus designed for use in a first embodiment of the method according to the invention.

The welding apparatus shown schematically in FIG. 1 comprises a number of parts known per se from, for example, the aforementioned article by Hatakeyama, et al or from U.S. Pat. No. 4,049,414. Among these parts are two blocks 1 and 3 with V-shaped grooves. Each groove can accommodate a light conducting fiber 5 and 7, respectively.

The first block 1 is connected to a micromanipulator 9, by means of which the block 1 can be displaced in a direction toward or away from the other block 3 (the z-direction). The other block 3 is connected to a micromanipulator 11, by means of which the block 3 can be displaced in three orthogonal directions denoted by x, y and z. The micromanipulators, known per se, are shown only schematically in the figures for the sake of simplicity.

In the proximity of the ends of the light conducting fibers 5 and 7 provided in the blocks 1 and 3, there is arranged a heat source. In the embodiment shown, the heat source comprises two electrodes 13 and 15. Electrodes 13 and 15 are connected to a controllable high voltage generator 17. Between these electrodes, an arc discharge can be produced. The arc discharge supplies the heat for welding together the ends of the two light conducting glass fibers 5 and 7. Of course, other heat sources may alternatively be used, for example a laser as described in an article by K. Kinoshita, et al entitled "End preparation and fusion splicing of an optical fiber array with a $CO_2$ laser" (*Applied Optics*, Vol. 18, No. 19, pp. 3256–3260, October 1979).

The light conducting fibers 5 and 7 are positioned with respect to each other and with respect to the heat source by means of the micromanipulators 9 and 11 under visual control. For this purpose, the welding apparatus is provided with an optical system and an imaging system. The optical system comprises a light source 19 with a condensor lens 20. The imaging system comprises, in this embodiment, a binocular microscope with two objectives 21, two mirrors 23 and two oculars 25. Other imaging systems may alternatively be used, for example, a projection system, as described in an article by A. J. J. Franken, et al entitled "Experimental semi-automatic machine for hot splicing glass fibres for optical communication" (*Philips Technical Review*, Vol. 38, No. 6, pp. 158-159, 1978/79).

In the welding apparatus used hitherto, the light source 19 emits visible light and the claddings of the light conducting fibers 5 and 7 are observed by means of the imaging system. When it is important that the cores of the fibers 5 and 7 be positioned accurately in line with each other (which is the case, for example, when the fibers are so-called monomode fibers), this method is less satisfactory.

Monomode fibers have cores with very small diameters (for example, smaller than 10 μm), so that the cores can be relatively offset through a comparatively large distance when the cores are arranged a few μm eccentrically to the outer circumferences of the claddings. Thus, it is of importance to observe not the cladding, but the core during the positioning operation. For this purpose, according to the invention, the light source 19 emits ultraviolet light. As described in, for example, U.S. Pat. No. 4,307,296, the core of a light conducting fiber generally comprises substances, for example germanium compounds, which fluoresce when they are irradiated with ultraviolet light.

The light source 19 generally produces visible light in addition to the ultraviolet light. This visible light is annoying because it illuminates the claddings of the fibers 5 and 7. As a result, the visibility of the fluorescent cores is reduced.

In order to avoid this, the light source 19 is provided with a low pass filter 27. Filter 27 transmits, for example, only light having a wavelength which is smaller than 400 nm. The fibers 5 and 7 are then not irradiated by visible light, and their nonfluorescent claddings remain substantially invisible. The beam of ultraviolet light originating from the light source 19 is designated in FIG. 1 by reference numeral 29.

The cores of the fibers 5 and 7 emit visible light as a result of the fluorescence. Two beams 31 of this light are passed through the objectives 21, and are reflected by the mirrors 23 to the oculars 25. In order to protect the observer from ultraviolet light, there are arranged in the paths of the beams 31 high pass filters 33. Filters 33, for example, pass only light having a wavelength larger than 400 nm.

Figure 2:
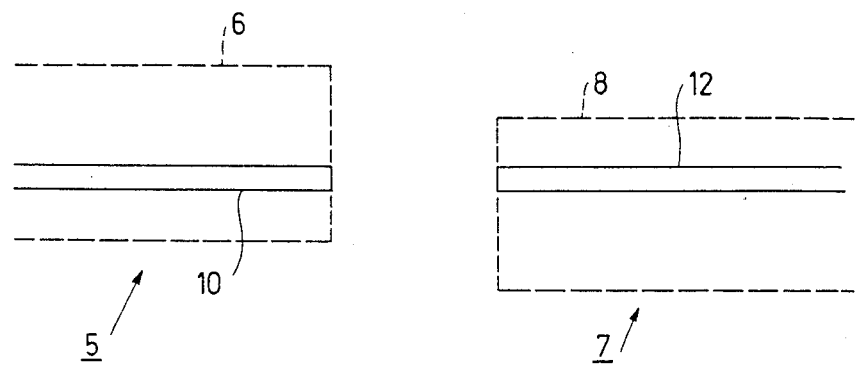
FIG. 2 shows an image of two properly positioned light conducting fibers.

With the device described, it is possible to arrange the cores of the light conducting fibers 5 and 7 accurately in line with each other, after which the two fibers are fused together. FIG. 2 gives an impression of the image that can be seen after the positioning and just before the fusion. The claddings 6 and 8 of the fibers 5 and 7 are not or are hardly visible, and they are indicated in FIG. 2 by dotted lines. The cores 10 and 12, indicated by solid lines, can be clearly observed.

It also appears from FIG. 2 that the cores 10 and 12 are (or may be) arranged eccentrically to the claddings 6 and 8, so that it is very desirable for the cores themselves to be positioned accurately. The weld then formed results only in a very small loss of light.

Figure 3:
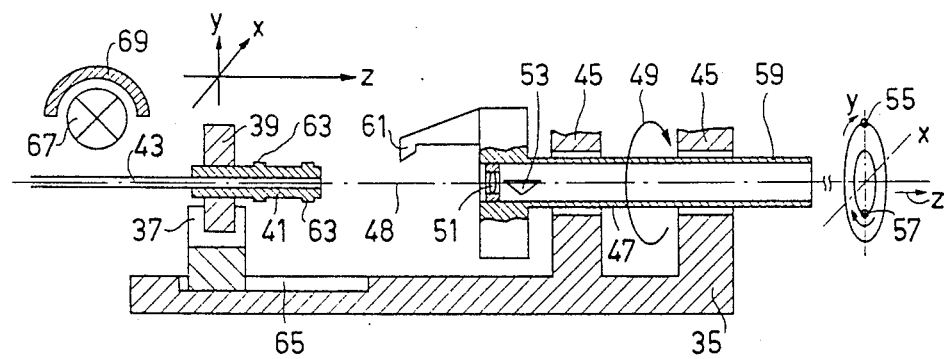
FIG. 3 is a schematic representation of a part of a device for trimming an envelope at an end of a light-conducting fiber.

The device shown schematically in FIG. 3 for machining an envelope at an end of a light conducting fiber comprises a supporting frame 35 with a micromanipulator 37. A support 39 is provided on micromanipulator 37 for securing an end of a monomode light conducting fiber 43 provided with an envelope 41. Supporting members 45 support a tubular housing 47 on frame 35. Housing 47 is arranged so as to be rotatable about an axis of rotation 48, as indicated by arrow 49.

The housing 47 accommodates an objective 51 and a reversing prism 53. Objective 51 and prism 53 are arranged eccentrically to the axis of rotation 48. The optical axis of the objective 51 is substantially parallel to the major side face of the prism. The rectangular side faces on the minor sides of the prism 53 are directed at right angles to the plane passing through the axis of rotation 48 and the optical axis of the objective 51.

A part of the light emanating from the right-hand end of the fiber 43 only passes through the objective 51, while the remaining part of the light passes through both the objective 51 and through the reversing prism 53. The two parts of the light will each produce a luminous spot 55 and 57, respectively, which can be observed at the right-hand end 59 of the housing 47. Due to the presence of the reversing prism 53, displacement of the fiber end in the x- or y-direction will result in a displacement of the luminous spots 55 and 57 also in the x- or y-direction, but in relatively opposite directions.

Due to the fact that the housing 47 rotates with the objective 51 and the reversing prism 53, each luminous spot will produce a circular image because the objective 51 and the reversing prism 53 are arranged eccentrically to the axis of observation and rotation 48. The circular images will be concentric only if the end of the fiber 43 is located on the axis of observation and rotation 48.

If the end of the core of the fiber 43 is not located on the axis of the observation and rotation 48, the images are eccentric. Then, when the fiber end is displaced, the images will move in relatively opposite directions. As a result, it is possible to rapidly and accurately position the light conducting core of the fiber end on the axis 48 by means of the micromanipulator 37.

When the core of the fiber end has been positioned on the axis 48, the micromanipulator 37 and the support 39 are translated along the axis 48 until mounting edges 63 of the envelope 41 are machined by a turning chisel 61. As a result, the outer surface of each mounting edge 63 is cut concentric with the light conducting core of the fiber end. The supporting frame 35 is provided with a slot 65 to permit the movement of the micromanipulator 37.

The device shown in FIG. 3, as described therefor, is well known from U.S. Pat. No. 4,289,374. In the known device, the light is radiated into the core from the other end of the fiber 43 (not shown). In many cases, this is impractical.

Therefore, the known device is improved by the addition of an ultraviolet light source 67 with a reflector 69. This light source is arranged so that it can transversely irradiate a portion of the fiber 43 at a certain distance (for example 5 cm) from the right-hand end of the fiber. In order to enable the ultraviolet light to reach the core, an opaque coating present on the fiber 43 should be removed at the area to be irradiated.

As a result of the ultraviolet light illuminating the fiber, the core fluoresces. The major part of the visible light thus produced is passed through the core in both directions. A part of this light reaches the right-hand end of the fiber 43 and produces, in the manner described above, the luminous spots 55 and 57.

Two examples of the use of the method according to the invention have been described above. It will be clear, however, that the method may be used in all cases in which light conducting fibers have to be visually positioned as, for example, in the process of mounting a fiber end in a plug part (of, for example, U.S. Pat. No. 4,451,115).

The method of producing visible light by transverse radiation of ultraviolet light into the core, as described with reference to FIG. 3, may also be used in a welding apparatus. For this purpose, in the welding apparatus shown in FIG. 1, the optical system could be replaced by an ultraviolet source, at a certain distance from the end of the first fiber 5, corresponding to the light source 67 of FIG. 3. A light detection device may then be arranged at the end of the second fiber 7 remote from the welding area.

If desired, the light detection device may also be arranged near the end of the fiber 7 facing the welding area. In this case, the light detection device should be designed so that the fiber projects from the device on both sides and a part of the light conducted through the fiber is absorbed by the device. Such a light detection device may comprise, for example, a glass rod provided with a groove and having a light detector at one of its ends, as described in an article by C. W. Miller entitled "Local detection device for single-mode fiber splicing" (Paper THAA2, *Digest Topical Meeting on Optical Fibre Communication,* pages 44-45, April 13-15, 1982, Phoenix, Ariz. U.S.A.). When the light detection device receives a maximum light signal, the ends of the two fibers 5 and 7 are positioned correctly with respect to each other at the welding area.

What is claimed is:

1. A method of visually positioning te end of a light conducting fiber, said fiber having a core and a cladding surrounding the core, said method comprising the steps of:
   transversely irradiating a porting of the fiber with ultraviolet light, said ultraviolet light having a wavelength such that it causes the core of the fiber to emit visible light; and
   positioning the end of the fiber by observing the visible light emitted by the core.

2. A method as claimed in claim 1, characterized in that:
   the irradiated portion of the fiber is spaced form the end of the fiber;
   the fiber has an opaque coating which is removed from the irradiated portion of the fiber before the fiber is illuminated; and
   the visible light emitted by the core emerges from the end of the fiber and is then observed in order to position the end of the fiber.

3. A device for visually positioning the end of a light conducting fiber, said fiber having a core and a cladding surrounding the core, said device comprising:
   an ultraviolet light source arranged to transversely irradiate a portion of the fiber with ultraviolet light, said ultraviolet light having a wavelength such that it causes the core of the fiber to emit visible light; and
   means for positioning the end of the fiber by observing the visible light emitted by the core.

4. A device as claimed in claim 3, characterized in that:
   the device further comprises:
   means for welding together the ends of two light conducting fibers;
   a low pass filter arranged between the ultraviolet source and the irradiated portion of the fiber; and
   a high pass filter arranged between the fiber and an observer; and
   the positioning means comprises a manipulator for positioning the ends of the two light conducting fibers with respect to each other and with respect to the welding means.

* * * * *

UNITED STATES PATENT AND TRADEMARK OFFICE
CERTIFICATE OF CORRECTION

PATENT NO. : 4,690,493

DATED : September 1, 1987

INVENTOR(S) : G.D. KHOE

It is certified that error appears in the above-identified patent and that said Letters Patent is hereby corrected as shown below:

Claim 1, line 1 (column 5, line 30), "te" should read --the--;

Claim 1, line 5 (column 5, line 36), "porting" should read --portion--;

Signed and Sealed this

Twelfth Day of January, 1988

Attest:

DONALD J. QUIGG

*Attesting Officer*　　　　　*Commissioner of Patents and Trademarks*